US010992575B2

(12) United States Patent
Kelam et al.

(10) Patent No.: US 10,992,575 B2
(45) Date of Patent: Apr. 27, 2021

(54) ASSIGNMENT OF INTERNET PROTOCOL ADDRESSES TO SERVICES

(71) Applicant: Hewlett Packard Enterprise Development LP, Houston, TX (US)

(72) Inventors: Koteswara Rao Kelam, Bangalore Karnataka (IN); Pradeep Sathasivam, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 31 days.

(21) Appl. No.: 16/263,354

(22) Filed: Jan. 31, 2019

(65) Prior Publication Data

US 2020/0252335 A1 Aug. 6, 2020

(51) Int. Cl.
| H04L 29/12 | (2006.01) |
| H04L 29/06 | (2006.01) |
| H04L 12/713 | (2013.01) |
| H04L 12/741 | (2013.01) |
| H04L 12/715 | (2013.01) |
| H04L 12/721 | (2013.01) |
| H04L 12/803 | (2013.01) |

(52) U.S. Cl.
CPC ............ H04L 45/586 (2013.01); H04L 45/64 (2013.01); H04L 45/66 (2013.01); H04L 45/74 (2013.01); H04L 47/125 (2013.01); H04L 61/1511 (2013.01); H04L 61/2007 (2013.01); H04L 69/169 (2013.01)

(58) Field of Classification Search
CPC ................................ H04L 45/66; H04L 45/64
USPC ........................................................ 370/254
See application file for complete search history.

(56) References Cited

U.S. PATENT DOCUMENTS

| 8,677,471 B2 | 3/2014 | Karels et al. | |
| 2010/0098082 A1* | 4/2010 | Sampath | ............... H04L 45/586 370/392 |
| 2015/0295862 A1* | 10/2015 | Banerjee | ............. H04L 49/3009 370/392 |
| 2016/0080280 A1* | 3/2016 | Ramachandran | ....... H04L 47/22 370/235 |

FOREIGN PATENT DOCUMENTS

CN 105635332 6/2016

OTHER PUBLICATIONS

Anderson, D.•, "Allow multiple (compatible) services to use the same loadBalancerIP #121": Dec. 28, 2017; 8 pages.
(Continued)

*Primary Examiner* — Angel T Brockman
(74) *Attorney, Agent, or Firm* — Jaffery Watson Mendonsa & Hamilton

(57) ABSTRACT

In an example, a first Internet Protocol (IP) address is assigned to a first service. The first service includes a plurality of pods and is to operate on a first port. A first node on which the first IP address is to be configured is selected from among a plurality of nodes based on a number of IP addresses configured on each of the plurality of nodes. Further, the first IP address is configured on the first node. The first IP address is assigned to a second service as well. The second service comprises a plurality of pods and is to operate on a second port.

20 Claims, 5 Drawing Sheets

(56) References Cited

OTHER PUBLICATIONS

Github.com; "kubernetes/contrib"; printed on Oct. 1, 2018 from webpage: https://github.com/kubernetes/contrib/tree/master/keepalivedvip; 7 pages.
Horenbeeck, M.V.; "Publishing multiple services to the Internet on a single IP address using a KEMP Load Balancer and content switching rules"; Mar. 1, 2014; 5 pages.
Kuntz, C. H., et al.; "Multiple Frontends for Azure Load Balancer"; Mar. 22, 2018; 5 pages.
Stackovertlow.com; "Kubernetes or Azure: assign different external IP to different services"; printed on Oct. 1, 2018 from webpage: https://stackoverflow.com/questions/45332397/kubernetesonazureassigndifferentexternaliptodifferentservices; 7 pages.

* cited by examiner

ASSIGNMENT OF INTERNET PROTOCOL ADDRESSES TO SERVICES

BACKGROUND

A service may be deployed on a cluster of computing nodes, and may be used to perform one or more operations, such as processing text in feeds on social media, processing images, and providing web pages. The service may include a plurality of pods, and may have an external Internet Protocol (IP) address, through which service requests, i.e., requests to perform the operations, may be directed to the service from anywhere on the internet. The service requests may be assigned to one or more pods of the service.

BRIEF DESCRIPTION OF DRAWINGS

The following detailed description references the figures, wherein.

DETAILED DESCRIPTION

Figure 1:
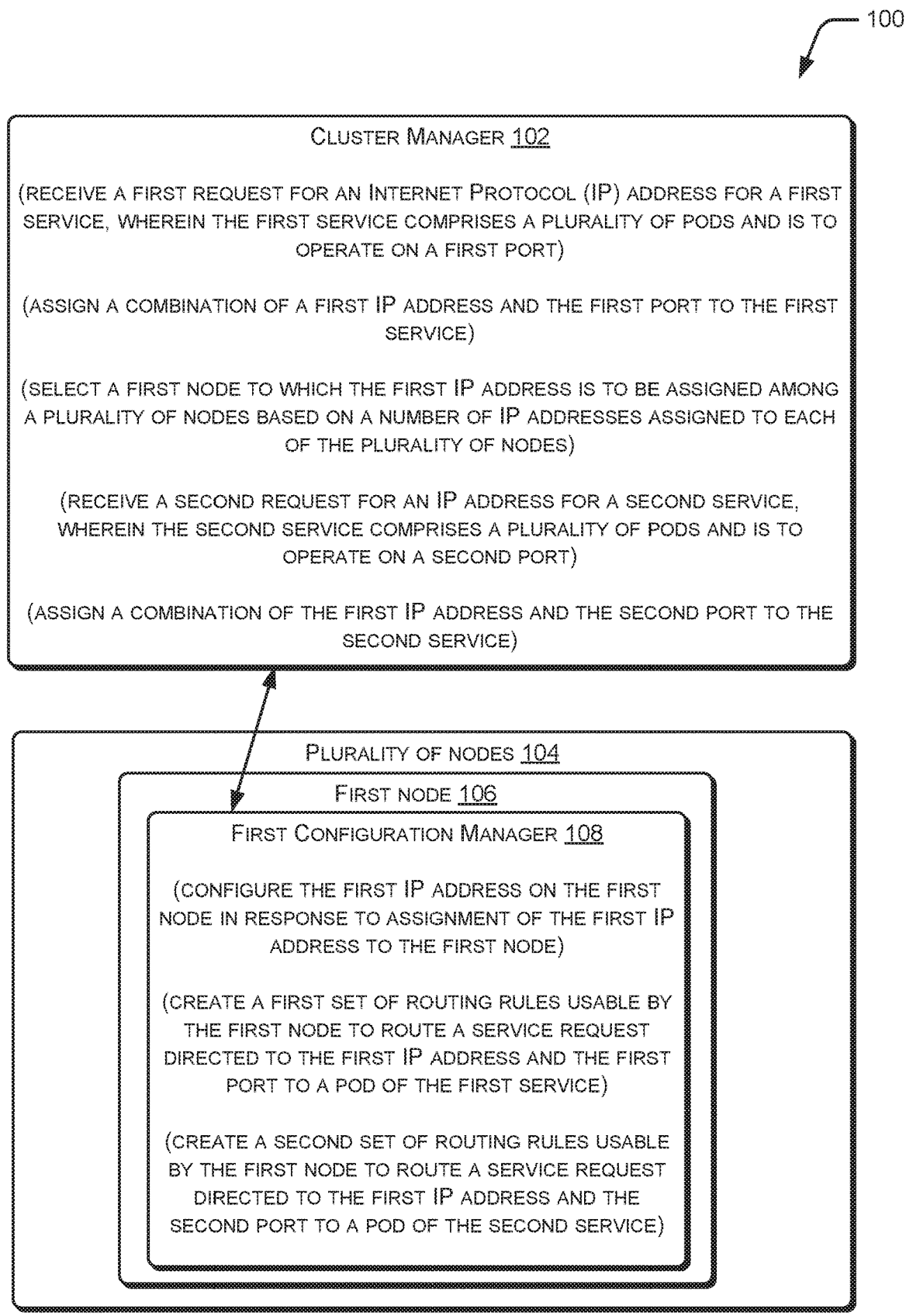
FIG. 1 illustrates a system to assign Internet Protocol (IP) addresses to services, according to an example implementation of the present subject matter.

A service may be referred to as an abstraction of a plurality of pods that perform a same set of functions. In some cases, a service may have an external Internet Protocol (IP) address, i.e., an IP address that can be accessed through the internet, assigned to it. Accordingly, the service can receive service requests from outside of a cluster on which the service is deployed. The received service requests may be allocated to one or more pods for being handled. The distribution of service requests among pods of the service may be referred to as load balancing, and the service having the external IP address may be referred to as a loadbalancer service. Hereinafter, the terms "service" and "loadbalancer service" will be used interchangeably. Further, the terms "IP address" and "external IP address" will be used interchangeably.

Typically, to create a loadbalancer service, load balancing plugins that can create loadbalancer services are to be used. A load balancing plugin may be provided by a cloud provider, which may offer network services, infrastructure, or business applications in the cloud. The load balancing plugin provided by a cloud provider is generally tailored for that cloud provider. Accordingly, it may not be possible to create loadbalancer services if load balancing plugins are not used. For instance, it may not be possible to create loadbalancer services on a bare metal cluster, i.e., a cluster of computing nodes that does not run on a cloud provider.

Further, generally, each service is to have a unique IP address. Thus, it may not be possible for multiple services to share an IP address. However, in some situations, such as when the number of services to be provisioned is more than the number of available IP addresses, multiple services may have to share an IP address.

The present subject matter relates to assignment of IP addresses to services. With the implementations of the present subject matter, IP addresses may be assigned to services without using load balancing plugins, and multiple services can share an IP address.

In accordance with an example implementation, a first request for an Internet Protocol (IP) address for a first service is received. The first request may be, for example, an event indicating creation of the first service. The first service includes a plurality of pods and is to operate on a first port. A port may be a logical construct that identifies a type of network service, as will be described below. In response to the first request, a combination of a first IP address and the first port may be assigned to the first service. Further, a first node on which the first IP address is to be configured is selected from among a plurality of nodes. The selection may be based on the number of IP addresses configured on each of the plurality of nodes. In response to selection of the first node, the first IP address is configured on the first node. Further, a first set of routing rules is created. The first set of routing rules can be used by the first node to route a service request directed to the first IP address and the first port to a pod of the first service.

Further, a second request for an IP address for a second service is received. The second service also includes a plurality of pods and is to operate on a second port. In response to the second request, a combination of the first IP address and the second port is assigned to the second service. Further, a second set of routing rules is created. The second set of routing rules can be used by the first node to route a service request directed to the first IP address and the second port to a pod of the second service.

The present subject matter enables creation of loadbalancer services without using load balancing plugins. For instance, by assigning an IP address to a service, selecting a node among a plurality of nodes on which the IP address is to be configured, and configuring the IP address on that node, the service requests directed to the service are received on the node, which can then be routed to pods of the service. Therefore, the present subject matter can be utilized in bare metal clusters.

Further, by assigning a combination of the first IP address and first port to one service and assigning a combination of the first IP address and second port to another service, the first IP address can be shared by multiple services. Since bare metal clusters may have less number of IP addresses available, the present subject matter provides an optimal manner of managing the IP addresses available with the bare metal clusters.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 to assign Internet Protocol (IP) addresses to services, according to an example implementation of the present subject matter. The system 100 may be implemented as a cluster of computing devices. Each computing device may be, for example, a desktop computer, a laptop computer, a server, or the like. The system 100 includes a cluster manager 102 and a plurality of computing nodes 104. The plurality of computing nodes may be referred to as the plurality of nodes, and includes a first node 106 that has a first configuration manager 108. The plurality of nodes may also include a second node (not shown in FIG. 1).

In an example, the cluster manager 102 may be deployed on a node other than the plurality of nodes 106. Further, the first configuration manager 108 may be deployed in the first node 108, as illustrated. The cluster manager 102 and the first configuration manager 108 may include, amongst other things, routines, programs, objects, components, data structures, and the like, which perform particular tasks or implement particular abstract data types, and may be coupled to and/or be executable by a processor of a computing device of the system 100. The processor may be implemented as microprocessors, microcomputers, microcontrollers, digital signal processors, central processing units, state machines, logic circuitries, and/or any devices that manipulate signals based on operational instructions.

Each node of the plurality of nodes 104 may be, for example, a computing device or may be a Virtual Machine (VM) that may run on all or part of a computing device. In an example, the plurality of nodes 104 may be a first cluster of nodes. A cluster of nodes may be referred to as a set of nodes which have their resources, such as storage, processor, and memory, managed together. In another example, the plurality of nodes 104 may be a subset of the first cluster of nodes. For instance, the plurality of nodes 104 may be nodes of the first cluster that are designated as external loadbalancer (ELB) nodes. A node designated as an ELB node may be selected for configuration of external IP addresses. The number of nodes of a cluster that are to be designated as ELB nodes may be decided, for example, by an administrator of the cluster based on load of the cluster.

In an example, each computing device of the system 100 may include memory, interface(s), and system data (not shown in FIG. 1). The memory may include any non-transitory computer-readable medium including volatile memory (e.g., RAM), and/or non-volatile memory (e.g., EPROM, flash memory, Memristor, etc.). The memory may also be an external memory unit, such as a flash drive, a compact disk drive, an external hard disk drive, or the like. The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In an example, the computing devices of the system 100 may be connected through a communication network (not shown in FIG. 1). The communication network may be a wireless network or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

In operation, the cluster manager 102 receives a first request for an Internet Protocol (IP) address for a first service. The first service may be, for example, a loadbalancer service, i.e., a service that is to have an external IP address, and the request may be for an external IP address. The first request may be received, for example, from the first service or from an entity that creates the first service, as will be explained with reference to FIG. 2. The first service may include a plurality of pods, such as a first pod, second pod, and third pod. The pods may be used to perform one or more operations. The first service may operate on a first port. The services, pods, ports, and their functions will be explained in greater detail with reference to FIG. 2. In response to receiving the first request, the cluster manager 102 may assign a combination of a first IP address and the first port to the first service. The first IP address may be an external IP address, which can be accessed from outside of the first cluster.

The cluster manager 102 may also select a node on which the first IP address is to be configured among the plurality of nodes 104. The selection may be based on the number of IP addresses configured on each of the plurality of nodes. For instance, the cluster manager 102 may select a node on which the least number of IP addresses are configured. The selected node may be, for example, the first node 106.

In response to the selection of the first node 106 for configuring the first IP address, the first configuration manager 108 of the first node 106 may configure the first IP address on the first node 106. The first configuration manager 108 may also create a first set of routing rules that can be used by the first node 106 to route a service request directed to the first service, i.e., a service request directed to the first IP address and the first port, to a pod of the first service.

The cluster manager 102 may also receive a second request for an IP address for a second service. The second service may also include a plurality of pods, such as a fourth pod, fifth pod, and sixth pod, and may operate from a second port, which is different from the first port. The cluster manager 102 may then assign a combination of the first IP address and the second port to the second service. In response, the first configuration manager 108 may create a second set of routing rules that can be used by the first node 106 to route a service request directed to the second service, i.e., a service request directed to the first IP address and the second port, to a pod of the second service.

Accordingly, the first node 106 can receive service requests directed to both the first service and the second service on the first IP address, and can route the service requests to the pods of the respective service based on the first set of routing rules and the second set of routing rules. Therefore, the present subject matter facilitates efficient management of the available IP addresses. The various aspects of the present subject matter will be explained in greater detail with reference to FIG. 2.

Figure 2:
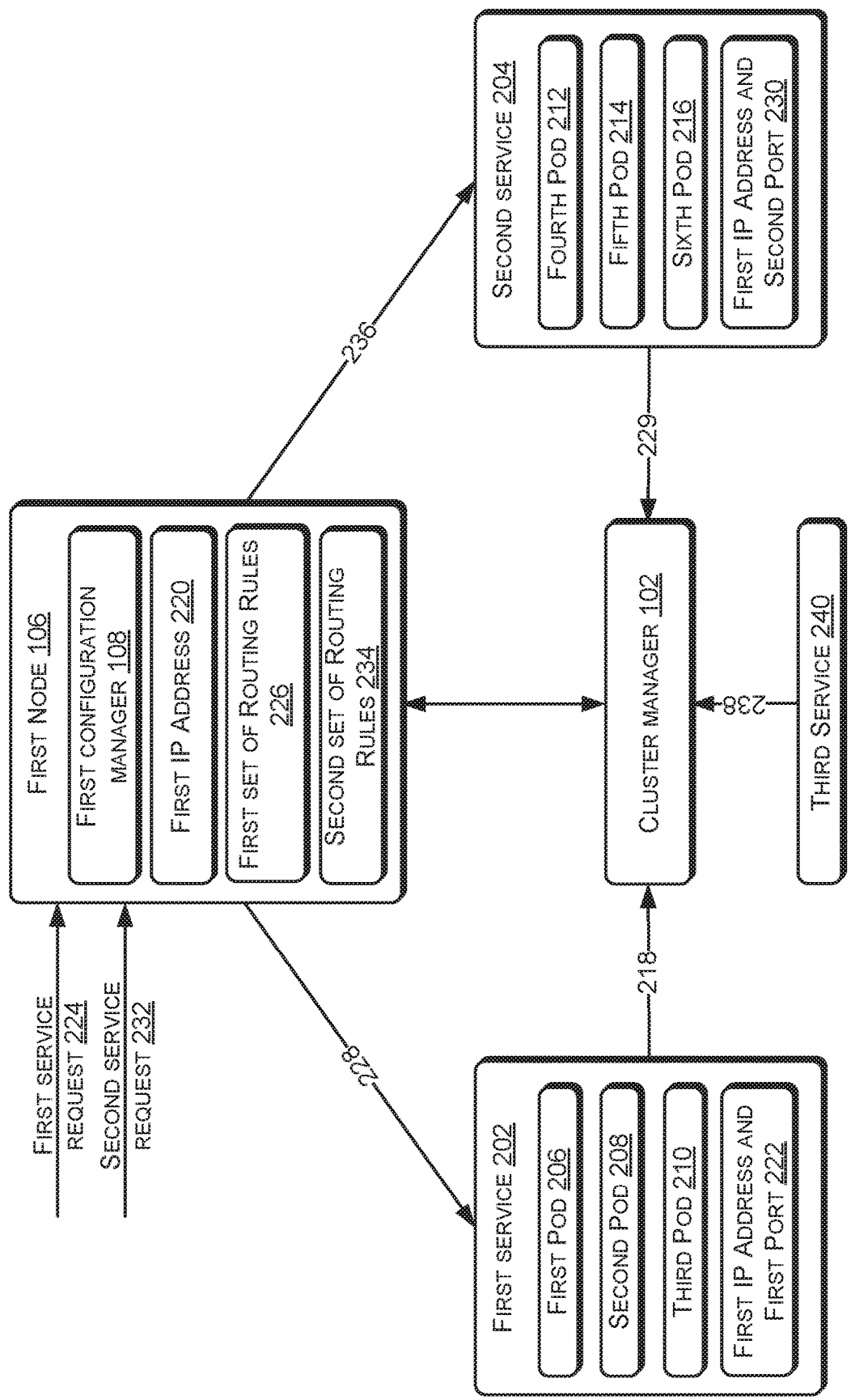
FIG. 2 illustrates assignment of an IP address to multiple services by a system, according to an example implementation of the present subject matter.

FIG. 2 illustrates assignment of an IP address to multiple services, according to an example implementation of the present subject matter. A service may be referred to as an abstraction of a plurality of pods that perform a same set of functions, such as processing text on feeds on a social media platform, processing images on a social media platform, and providing web pages, such as e-commerce web pages. The service stands in for its pods, and can be accessed by clients of an application. The application may be, for example, a Kubernetes™-based application.

A pod may be referred to as a basic functional unit including a plurality of containers that are related to each other in terms of the functions performed and services provided. A container may be defined as a computing instance that can host a program and operates as a separate computer from the point of view of the program. For instance, the container can isolate a process running within itself from a computing node the container is hosted on and from other containers hosted on the computing node. The container may provide, among other things, code, runtime, system tools, system libraries, and settings to the process. Further, the container can provide a consistent runtime environment to the process regardless of the computing node it is hosted on. All containers within a pod may share a set of resources, such as storage, memory, and network. In an example, a pod may include frontend and backend containers, where the frontend containers provide user interfaces and the backend containers provide databases, data processing, and the like. In the below explanation, the terms "hosted on", "deployed on", and "running on" are used interchangeably.

In an example, a service may be deployed on a cluster of nodes, also referred to as a cluster. The service may be deployed on nodes of the cluster that are designated as ELB nodes, as explained earlier. For instance, the first service 202 and the second service 204 may be deployed on a node of the plurality of nodes 104 of the first cluster. Accordingly, the pods of the service may be deployed on nodes of the cluster. For example, a pod of the first service 202, such as a first pod 206, second pod 208, and third pod 210, and a pod of the second service 204, such as third pod 212, fourth pod 214, and fifth pod 216, may be deployed on a node of the plurality of nodes 104. The pods of a service may be deployed in the nodes in any combination. For example, the first pod 206, second pod 208, and third pod 210 may all be deployed on the first node 106 or may all be deployed on the second node (not shown in FIG. 2). In another example, some pods of the first service 202 may be deployed on the first node 106, while the remaining pods may be deployed on the second node. Since a service is an abstraction of a plurality of pods, and the pods of a service may be distributed across several nodes, the pods 206-210 of the first service 202 are not illustrated in FIG. 2 as deployed on the first node 106, but as part of the first service 202. However, as explained above, any of the pods 206-210 may be deployed on the first node 106. Similarly, although not illustrated in FIG. 2, any of the pods 212-216 may be deployed on the first node 106.

As mentioned above, a service is an abstraction of a set of pods and stands in for its pods, and can be accessed by clients. The clients may access the service for the performance of one or more operations. A request received by a service for performance of an operation may be referred to as a service request, and fulfilling of the service request may be referred to as handling of the service request. To facilitate accessing the service, the service may have an associated IP address. If the service is to be deployed on the first cluster, the IP address may have to be configured on a node, such as the first node 106, of the first cluster. The assignment and configuration of the IP address will be explained below:

In an example, a service, such as the first service 202, that is to be deployed on the first cluster, upon its creation, may request the cluster manager 102 for the cluster for an IP address. In another example, the request for an IP address for the service may be sent by an entity creating the service. The entity creating the request may send the request as part of a service creation event (an event indicating creation of the service). Alternatively, the entity may not send a separate request for IP address, and the cluster manager 102 may consider the service creation event as the request for IP address. In an example, the cluster manager 102 may be common for all nodes of the first cluster. Further, the cluster manager 102 may be deployed on a node of the first cluster, and may be accessible from the remaining nodes of the first cluster. The request for the IP address for the first service 202 may be referred to as the first request, and may be illustrated by arrow 218. Upon receiving the first request 218, the cluster manager 102 may assign an IP address to the first service 202. The IP address assigned to the first service 202 is referred to as a first IP address 220. The first IP address 220 may be one of a plurality of IP addresses available to the first cluster. To assign the first IP address 220, the cluster manager 102 may include or may interact with an IP Address Management (IPAM) module (not shown in FIG. 1). The assignment of the IP address by the cluster manager 102, which is deployed on the first cluster, prevents the use of a cloud provider for assignment and management of IP addresses.

In an example, the first service 202 may have to operate on a particular port, which may be a logical construct that identifies a type of network service. For example, the port numbered 23 identifies Telnet remote login service, while the port numbered 53 identifies Domain Name System (DNS) service. The port may be associated with a protocol type of communication. For example, a port for DNS service may be associated with Transmission Control Protocol (TCP) ("TCP port 53"), while another port for DNS service may be associated with User Datagram Protocol (UDP) ("UDP port 53"). When the cluster manager 102 assigns the first IP address to the first service 202, the cluster manager 102 may also assign the associated port to the first service 202. Accordingly, the cluster manager 102 may be said to be assigning a combination of the first IP address 220 and the first port to the first service 202. The combination of the first IP address 220 and the first port is illustrated by the block 222 in the first service 202.

In addition to assigning the combination 222 of the first IP address 220 and first port to the first service 202, the cluster manager 102 may also select a node on which the first IP address 220 is to be configured. The node may be selected from the plurality of nodes 104 based on the number of IP addresses configured on each node of the plurality of nodes 104. For instance, the cluster manager 102 may select the node on which the least number of IP addresses are configured. In an example, the cluster manager 102 may select the node in a round-robin fashion. The selection of the node, in accordance with an example, will be explained with reference to FIG. 3. The selected node may be the first node 106. In response to selection of the first node 106, the first configuration manager 108 may configure the first IP address 220 on the first node 106.

Upon configuration of the first IP address 220 on the first node 106, service requests directed to the first service 202, i.e., directed to the first IP address 220 and the first port, may be received at the first node 106. An example service request directed to the first service 202 is a first service request 224. The service requests are to be routed among pods of the first service 202 for being handled. To facilitate routing of the service requests, the first node 106 may utilize a first set of routing rules 226. The first set of routing rules 226 may specify the manner in which the service requests are to be routed among the pods of the first service 202. The routing of the service requests directed to the first service 202 is illustrated by the arrow 228 from the first node 106 to the first service 202.

In an example, the first set of routing rules 226 may include Destination Network Address Translation (DNAT)

rules, which enable redirecting the service requests received at the first IP address 220 and the first port to an internal IP address (an IP address accessible within the first cluster) of a pod of the first service 202. The first set of routing rules 226 may be created by the first configuration manager 108, and may be stored in a memory (not shown in FIG. 2) of the first node 106. The memory of the first node 106 may be referred to as first memory. In an example, the first set of routing rules 226 may be added to a first IP table (not shown in FIG. 2) in the first memory.

Similar to the first service 202, other services, such as the second service 204, may also have to be deployed on the plurality of nodes 104. To facilitate the deployment of the second service 204 on the plurality of nodes 104, the second service 204 or an entity creating the second service 204 may send a request for an IP address to the cluster manager 102. As explained above, in an example, the request for an IP address may be a service creation event indicating creation of the second service 204. The request for an IP address for the second service 204 may be referred to as a second request 229. To assign an IP address to the second service 204, the cluster manager 102 may determine if an already-assigned IP address, such as the first IP address 220, can be assigned to the second service 204. For instance, the cluster manager 102 may determine if a combination of (i) an IP address that is already assigned and (ii) the second port can be assigned to the second service 204.

In an example, the cluster manager 102 may initiate the aforesaid determination based on a sharing identifier, which indicates the permissibility of sharing of IP address for a service. A sharing identifier may be included in a request for IP address for a service. For instance, the first request 218 may include a first sharing identifier and the second request 229 may include a second sharing identifier. To add the sharing identifier to a request, in an example, an annotation indicating permissibility of IP address sharing may be added to an annotations section of a service manifest file, which may be used to declare the service. The annotation may be, for example, "allow-ip-sharing", and may be provided by a developer who instructed creation of the service. The sharing identifier may then be added as a value of the annotation. To facilitate sharing an IP address between two services, the sharing identifier of each of the two services may be made identical to each other.

When the cluster manager 102 receives the first request 218, the cluster manager 102 may determine whether the first request 218 includes a sharing identifier ("first sharing identifier"). If the first request 218 includes the first sharing identifier, the cluster manager 102 may compare the first sharing identifier with sharing identifiers of services that are already deployed on the first cluster. If the first request 218 does not include the first sharing identifier, or if the first sharing identifier does not match with sharing identifier of any of the already-deployed services, the cluster manager 102 may assign a combination of a unique IP address and the first port to the first service 202. Subsequently, when the cluster manager 102 receives the second request 229, the cluster manager 102 may determine whether the second request 229 includes a sharing identifier ("second sharing identifier"). If the second request 229 includes the second sharing identifier, and the second sharing identifier matches with the first sharing identifier, the cluster manager may deduce an intention of the developer for sharing of an IP address between the first service 202 and the second service 204.

Upon deduction of the intention, the cluster manager 102 may determine whether the first IP address 220 can be shared by the first service 202 and the second service 204, i.e., determine whether a combination of the first IP address 220 and the second port can be assigned to the second service 204. The cluster manager 102 may determine that the first service 202 and the second service 204 can share the first IP address 220 if a second port, on which the second service 204 is to operate, is different from the first port, on which the first service 202 operates. Thus, the cluster manager 102 may ensure that all services deployed on the first cluster are provided with a unique combination of IP address and port. To summarize, in an example, the first IP address 220 may be shared by the first service 202 and the second service 204 (i) if the first sharing identifier matches with the second sharing identifier, and (ii) if the first port is different from the second port.

In some cases, the second port may be different from the first port. For example, the first service 202 may be a DNS service for TCP and the second service 204 may be a DNS service for UDP. Accordingly, the first port may be TCP port 53, while the second port may be UDP port 53. In such cases, as mentioned above, the cluster manager 102 may assign a combination 230 of the first IP address 220 and the second port to the second service 204. Accordingly, the service requests directed to the second service 204, i.e., to the first IP address 220 and the second port, may be directed to the pods of the second service 204. An example of such a service request is a second service request 232.

Since the first IP address 220 is configured on the first node 106, the service requests directed to the second service 204 are received at the first node 106. Accordingly, the service requests are to be routed among the pods of the second service 204 by the first node 106. To facilitate the routing, the first node 106 may utilize a second set of routing rules 234. The second set of routing rules 234 may be similar to the first set of routing rules 226, and may specify the manner in which the service requests are to be routed among the pods of the second service 204. The routing of the service requests directed to the second service 204 is illustrated by the arrow 236 from the first node 106 and the second service 204. Further, similar to the first set of routing rules 226, the second set of routing rules 236 may also be created by the first configuration manager 108, may be added to the first IP table, and may be stored in the first memory.

When the first node 106 receives a service request at the first IP address 220, the first node 106 may identify the port specified in a destination network address field of the service request. If the port is identified to be the first port, the first node 106 may determine the service request is meant for the first service 202, and may use the first set of routing rules 226 to direct the service request to a pod of the first service 202. Contrarily, if the port is identified to be the second port, the first node 106 may use the second set of routing rules 236 to direct the service request to a pod of the second service 204.

From the above, it can be understood that the present subject matter facilitates sharing an IP address among multiple services deployed on a cluster of nodes and also facilitates error-proof and efficient routing of the service requests directed to the services that share an IP address. Therefore, the present subject matter can be used in scenarios where the number of IP addresses available is less than the number of services to be deployed. The present subject matter can also be used in cases where a similar service is to be deployed on different protocol types. For example, a DNS service for TCP protocol and a DNS service for UDP protocol can share a single IP address.

Although, in the above description, an IP address is explained as being shared by two services alone, it will be understood that an IP address can be shared by more than two services as well. For instance, if a third request 238 for assignment of IP address for a third service 240 is received, the cluster manager 102 may determine if the third request 238 includes a third sharing identifier. If the third sharing identifier is present, it may be compared with sharing identifiers corresponding to services that are already deployed on the first cluster. Based on the comparison, if it is determined that the third sharing identifier matches with the first sharing identifier (and the second sharing identifier), and if it is determined that the third service 240 is to operate on a third port different from the first port and the second port, the cluster manager 102 may assign a combination of the first IP address 220 and the third port to the third service 240. If the third sharing identifier is different from the first sharing identifier and other sharing identifiers, the cluster manager 102 may assign a combination (not shown in FIG. 2) of a second IP address and the third port to the third service 240. The second IP address may be hitherto unassigned to any service.

Even if the third sharing identifier matches with the first sharing identifier, if the third service 240 is to operate on the first port (or the second port), the cluster manager 102 may determine that the sharing of the first IP address 220 with the third service 240 is not possible, as a unique combination of an IP address and a port is not available between the third service 240 and the first service 202 (or the second service 204). Accordingly, the cluster manager 102 may assign a combination of the second IP address and the first port to the third service 240.

Upon assigning the second IP address (in combination with the first port or the third port, as discussed above) to the third service 240, a node, such as a second node (not shown in FIG. 2), on which the second IP address is to be configured may be selected based on the number of IP addresses configured on each node of the plurality of nodes 104. Subsequently, a configuration manager on the selected node, such as a second configuration manager on the second node, may configure the second IP address on the second node. Therefore, the present subject matter ensures that IP addresses are distributed uniformly across the plurality of nodes 104. The selection of nodes for configuring the IP addresses will be explained in greater detail with reference to FIG. 3.

Figure 3:
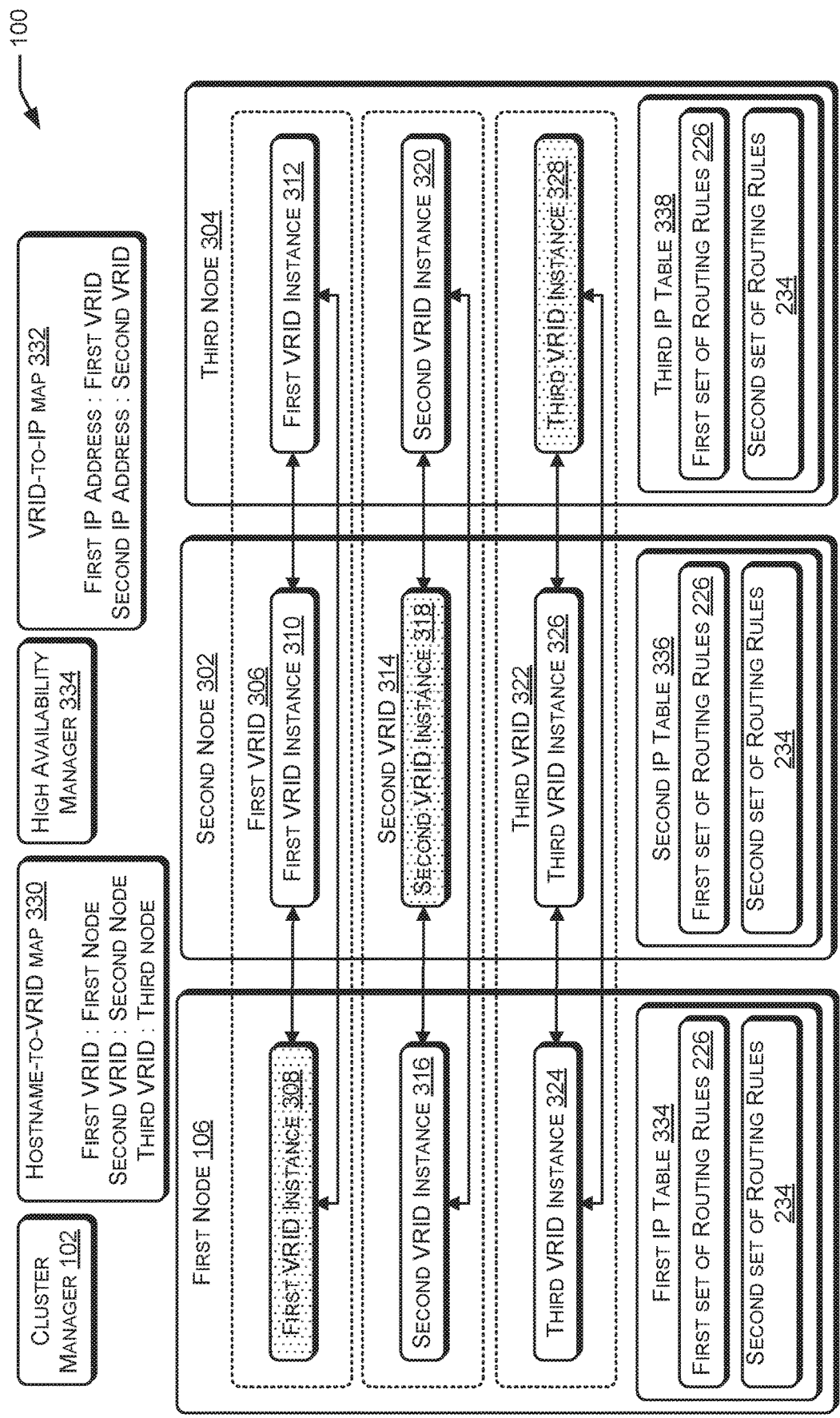
FIG. 3 illustrates various components of a system that is to assign IP addresses to services, according to an example implementation of the present subject matter.

FIG. 3 illustrates various components of the system 100 that is to assign IP addresses to services, according to an example implementation of the present subject matter. As explained earlier, the system 100 includes the cluster manager 102 and the plurality of nodes 104. In addition to the first node 106, the plurality of nodes 104 also includes a second node 302 and a third node 304. The second node 302 and the third node 304 may be ELB nodes. The plurality of nodes 104 may provide high availability to the services deployed on them, even if a node fails. Further, the IP addresses may be evenly distributed across the nodes. These aspects will be explained below:

To facilitate selection of node for configuration of IP address and for high availability, the present subject matter utilizes the concept of Virtual Router Identifiers (VRIDs), where a VRID includes a plurality of VRID instances, of which one VRID instance is a master VRID instance and the remaining VRID instances are backup VRID instances. Each VRID instance may be deployed on a node of the plurality of nodes. Further, no two VRID instances of a VRID may be deployed on the same node. For instance, the system 100 may include a first VRID 306 having a first VRID instance 308 on the first node 106, first VRID instance 310 on the second node 302, and first VRID instance 312 on the third node 304. Of the three first VRID instances, the first VRID instance 308 on the first node 106 may be the master VRID instance, while the remaining VRID instances may be the backup VRID instances. Similarly, the system 100 may include a second VRID 314 having a second VRID instance 316 on the first node 106, second VRID instance 318 on the second node 302, and second VRID instance 320 on the third node. Of the three second VRID instances, the second VRID instance 318 on the second node 302 may be the master VRID instance, while the remaining second VRID instances may be the backup VRID instances. Further, the system 100 may include a third VRID 322 having a third VRID instance 324 on the first node 106, third VRID instance 326 on the second node 302, and third VRID instance 328 on the third node. Of the three third VRID instances, the third VRID instance 328 on the third node 304 may be the master VRID instance, while the remaining third VRID instances may be the backup VRID instances.

The first VRID instance 308 on the first node 106 may be referred to as the master VRID instance of the first VRID 306. Similarly, the second VRID instance 318 on the second node 302 may be referred to as the master VRID instance of the second VRID 314 and the third VRID instance 328 on the third node 304 may be referred to as the master VRID instance of the third VRID 322. The master VRID instances of each VRID is shown dotted to distinguish them from the backup VRID instances. The purpose of using VRIDs and VRID instances, and selection of the master VRID instance will be explained in the subsequent paragraphs.

In an example, the number of VRIDs may be same as the number of nodes in the plurality of nodes 104. For instance, the number of nodes is three (first node 106, second node 302, and third node 304), the number of VRIDs may also be three. Further, the master VRID instances may be selected to ensure a uniform distribution of master VRID instances across the plurality of nodes 104. For instance, the master VRID instance of the first VRID 306 may be the VRID instance on the first node 106 (i.e., the first VRID instance 308), the master VRID instance of the second VRID 314 may be the VRID instance on the second node 302 (i.e., the second VRID instance 318), and the master VRID instance of the third VRID 322 may be the VRID instance on the third node 304 (i.e., the third VRID instance 328). The information of which node has the master VRID instance of a particular VRID may be stored in a hostname-to-VRID map 330. The hostname-to-VRID map 330 map may be stored, for example, in a centralized location on the first cluster that can be accessed by all nodes of the first cluster.

In an example, to select a node for configuration of an IP address, the cluster manager 102 may select a VRID to which the IP address is to be mapped. The selection of the VRID causes the node that has the master VRID instance of the selected VRID to be selected for configuration of the IP address. For example, if the cluster manager 102 selects the first VRID 306 for mapping the first IP address 220, the first node 106, which has the master VRID instance of the first VRID 306, gets selected for configuration of the first IP address 220. The cluster manager 102 may select a VRID for mapping the IP address based on the number of IP addresses assigned to each VRID. For instance, the cluster manager 102 may select a VRID to provide a uniform distribution of IP addresses across the VRIDs.

To determine the number of IP addresses assigned to each VRID, in an example, the cluster manager 102 may utilize a VRID-to-IP map 332, which includes the details of the IP addresses mapped to each VRID. The VRID-to-IP map 332 may be stored, for example, in a centralized location on the first cluster that can be accessed by all nodes of the first cluster. Further, the cluster manager 102 may also update the VRID-to-IP map 332 with the selected VRID for the particular IP address. For example, the cluster manager 102 may update the VRID-to-IP map 332 with a key-value pair, where the key may be the IP address, such as the first IP address 220, and the value of the key may be the selected VRID, such as the first VRID 306.

In response to updating of the VRID-to-IP map 332, the first configuration manager 108 (not shown in FIG. 3) may detect the update. Similarly, the configuration manager deployed on each of the other nodes also detects the update to the VRID-to-IP map 332. Since, from the update, the first configuration manager 108 determines that the VRID selected is the first VRID 306 and the IP address is the first IP address 220, the first configuration manager 108 may configure the first IP address 220 on the first node 106. Therefore, the update of the VRID-to-IP map 332 by the cluster manager 102 causes selection of the first node 106 for configuration of the first IP address 220.

The provision of high availability to the services even in case of node failure will be explained now. As explained above, each VRID has one master VRID instance and one or more backup VRID instances. The VRID instances of a VRID communicate with each other periodically, as illustrated by the arrows between the first VRID instance 308 and first VRID instance 310, between the first VRID instance 310 and first VRID instance 312, and between the first VRID instance 312 and the first VRID instance 308. In an example, the communication between the VRID instances may be according to Virtual Router Redundancy Protocol (VRRP). When a node fails, the VRID instance on that node does not respond to messages from the other VRID instances. Therefore, the communication among the VRID instances ensures detecting failure of a node of the plurality of nodes 104.

When, based on the communication among the VRID instances, it is detected that a node hosting the master VRID instance of a VRID has failed, in an example, the backup VRID instances may negotiate among themselves to elect a new master of the VRID. For instance, if the first node 106, which hosts the master VRID instance of the first VRID 306, has failed, the first VRID instance 310 (on the second node 302) and the first VRID instance 312 (on the third node 304) negotiate among themselves and elect a new master VRID instance of the first VRID 306. The new master VRID instance may be, for example, the first VRID instance 310, on the second node 302. In response to the change in the master VRID instance, a high availability manager 334 may update the hostname-to-VRID map 330 to reflect the change. Since the first VRID instance 310 is hosted on the second node 302, the second configuration manager may configure the IP addresses mapped to the first VRID 306, such as the first IP address 220, on the second node 302.

In another example, upon failure of the first node 106, the first VRID instance 308 is retained as the master VRID instance of the first VRID 306, and the first VRID instance 310 and first VRID instance 312 may not negotiate among themselves as to which will be the master VRID instance, but negotiate as to the node on which the first IP address is to be configured. Accordingly, the hostname-to-VRID map 330 may not be updated. In accordance with the example, the master VRID instance of a VRID may be updated upon an input, for example, from an administrator of the first cluster. The input may be provided, for example, when the first node 106 has encountered a fatal error, is taken out of service, or the like. The retention of the master VRID instance by default and changing the master VRID instance upon an instruction to do so prevents changing of master VRID instance due to transient errors, such as transient network failures and transient node failures.

Subsequent to change of the master VRID instance, once the failed node comes back to an operational state, the VRID instance on the node can reclaim mastership of the VRID for which it was the master prior to its failure. The configuration of IP addresses on a new node, based on the negotiation among the VRID instances, in accordance with both the above examples, will be explained below:

To determine the IP addresses that are mapped to the first VRID 306, the second configuration manager may refer to the VRID-to-IP map 332. Further, the IP addresses mapped to the first VRID are configured on the second node 302. Therefore, the service requests directed to the first service 202 and the second service 204, to which the first IP address 220 is assigned, may be received at the second node 302. From the second node 302, the service requests directed to the first service 202 and second service 204 may be routed to the pods of the first service 202 and second service 204, respectively. Thus, despite failure of a node, the service requests are continued to be received and handled by the plurality of nodes 104.

In an example, to identify the manner in which the service requests to the first service 202 and second service 204 are to be routed, the first set of routing rules 226 and second set of routing rules 234 may be used by the second node 302. To access the first set of routing rules 226 and second set of routing rules 234, a memory of the second node 302 ("second memory") may store the first set of routing rules 226 and second set of routing rules 234. In an example, the first set of routing rules 226 and second set of routing rules 234 may be created by the second configuration manager and stored in the second memory. Such a creation may be independent of the generation by the first configuration manager 108. Further, the first set of routing rules 226 and second set of routing rules 234 may be generated and stored in a memory of the third node 304 as well, to enable the third node 304 to route service requests in case the first VRID instance 312 becomes the master VRID instance of the first VRID 306.

In an example, the first node 106 includes a first IP table 334, the second node 302 may include a second IP table 336, and the third node 304 may include a third IP table 338. The IP tables include the set of routing rules corresponding to all services deployed on the plurality of nodes 104. In an example, the IP tables may be Linux® IP tables. An IP table of a node is updated by a configuration manager of that node with new sets of routing rules upon their creation.

In an example, the steps for reconfiguration of the IP address in response to failure of a node may be performed with the help of Keepalived, a routing process that facilitates load balancing and high availability.

Figure 4:
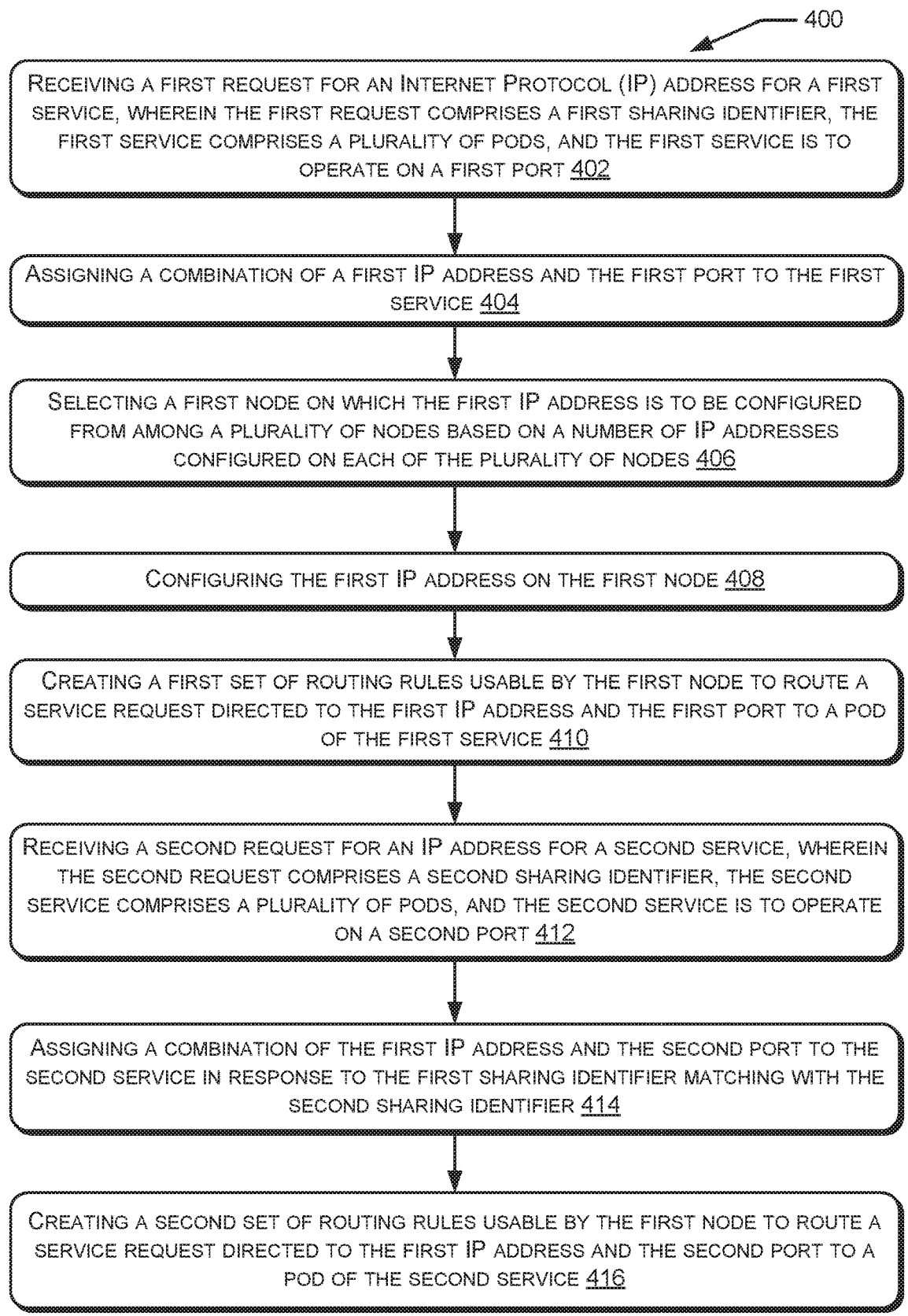
FIG. 4 illustrates a method for facilitating assignment of IP addresses to services, according to an example implementation of the present subject matter.

FIG. 4 illustrates a method 400 for assignment of Internet Protocol (IP) addresses to services, according to an example implementation of the present subject matter.

The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 400 may be implemented in a variety of systems, the method 400 is described in relation to the system 100, for ease of explanation. In an example, the steps of the method 400 may be performed by a processing resource, such as a processor of a computing device of the system 100.

Referring to method 400, at block 402, a first request for an Internet Protocol (IP) address for a first service is received. The first service may be, for example, the first service 202. The request may be, for example, an event indicating creation of the first service or may be part of such an event, as explained earlier. The first request may include a first sharing identifier. Further, the first service includes a plurality of pods, such as the first pod 206, second pod 208, and third pod 210, and is to operate on a first port. In an example, the first service is a Domain Name System (DNS) service for Transmission Control Protocol (TCP) and the first port is TCP port 53.

At block 404, a combination of a first IP address and the first port is assigned to the first service. At block 406, a first node on which the first IP address is to be configured is selected from among a plurality of nodes. The selection may be based on a number of IP addresses configured on each of the plurality of nodes. The plurality of nodes may include a first node, such as the first node 106, and a second node, such as the second node 302. The steps at block 402-408 may be performed by a cluster manager of a cluster, such as the cluster manager 102.

In an example, the selection of the first node may be performed by selecting a first Virtual Router Identifier (VRID) to which the first IP address is to be mapped from a plurality of VRIDs based on a number of IP addresses mapped to each of the plurality of VRIDs. The first VRID may include a first VRID instance running on the first node and a first VRID instance running on the second node. Further, the first VRID instance running on the first node may a master VRID instance of the first VRID and the first VRID instance running on the second node may be a backup VRID instance of the first VRID. The first VRID may be, for example, the first VRID 306. Accordingly, the first VRID instance running on the first node may be the first VRID instance 308 and the first VRID instance running on the second node may be the first VRID instance 310.

At block 408, the first IP address is configured on the first node. In addition, at block 410, a first set of routing rules is created. The first set of routing rules may be, for example, the first set of routing rules 226, and can be used by the first node to route a service request directed to the first IP address and the first port to a pod of the first service. The steps at blocks 408 and 410 may be performed by a configuration manager of the first node, such as the first configuration manager 108.

At block 412, a second request for an IP address for a second service is received. The second request may include a second sharing identifier. Further, the second service may include a plurality of pods, and is to operate on a second port. In an example, the second service is DNS for User Datagram Protocol (UDP), and the second port is UDP port 53. Subsequently, at block 414, a combination of the first IP address and the second port is assigned to the second service. The combination may be assigned in response to the first sharing identifier matching with the second sharing identifier, as explained with reference to FIG. 2. The steps at blocks 412 and 414 may be performed, for example, by the cluster manager 102.

Further, at block 416, a second set of routing rules, such as the second set of routing rules 234, is created. The second set of routing rules can be used by the first node to route a service request directed to the first IP address and the second port to a pod of the second service. The second set of routing rules may be created, for example, by the first configuration manager 108.

In an example, the method 400 may include routing a first service request directed to the first IP address and the first port to the pod of the first service based on the first set of routing rules. The method 400 may also include routing a second service request directed to the first IP address and the second port to the pod of the second service based on the second set of routing rules.

Further, in an example, in response to failure of the first node, the method 400 may include selecting the first VRID instance running on the second node as the master VRID of the first VRID. The method 400 may further include configuring the first IP address on the second node, as explained with reference to FIG. 3.

Figure 5:
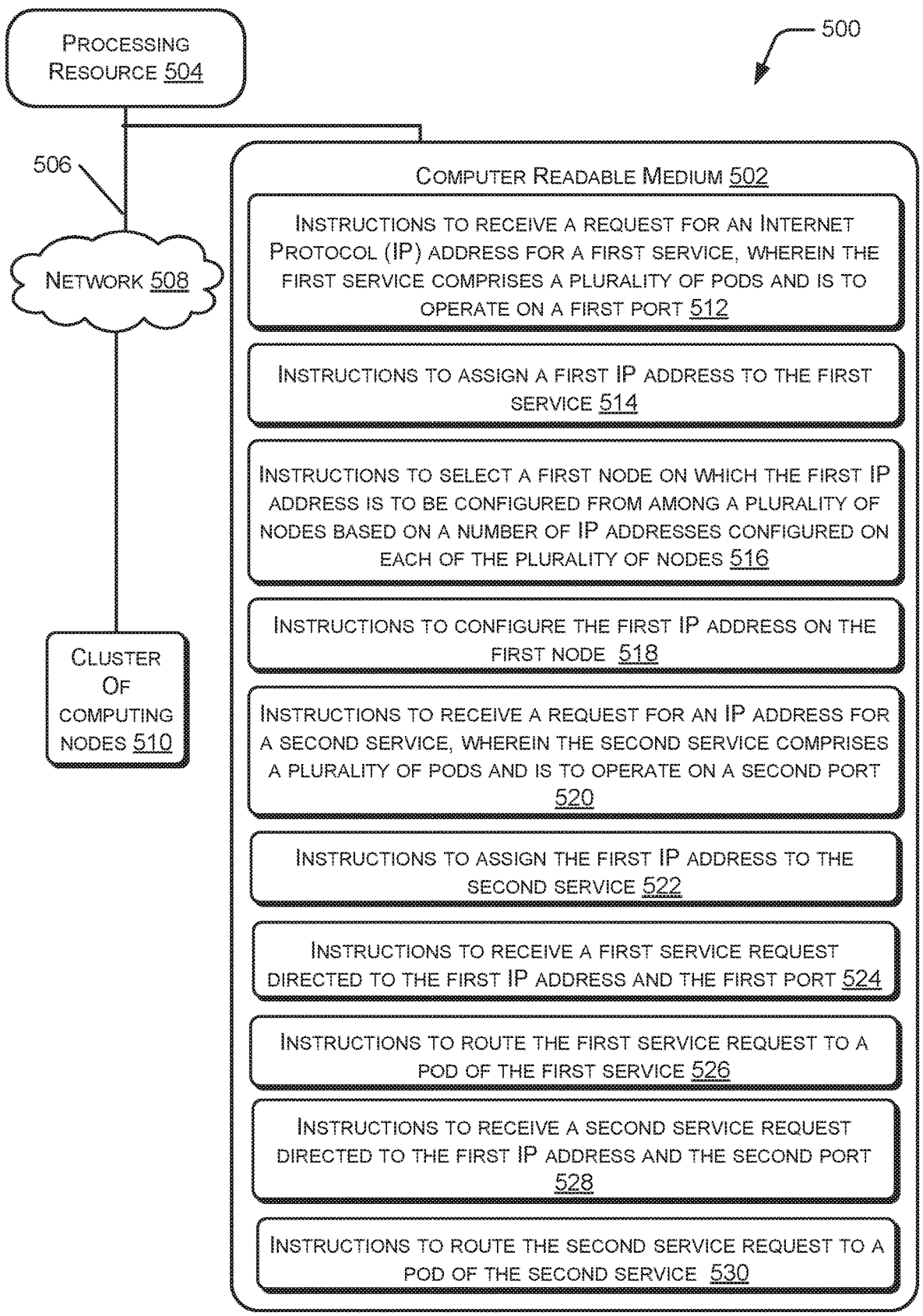
FIG. 5 illustrates a computing environment, implementing a non-transitory computer-readable medium for facilitating assignment of IP addresses to services, according to an example implementation of the present subject matter.

FIG. 5 illustrates a computing environment 500, implementing a non-transitory computer-readable medium 502 for assignment of Internet Protocol (IP) addresses to services, according to an example implementation of the present subject matter.

In an example, the non-transitory computer-readable medium 502 may be utilized by a system, such as the system 100. In an example, the computing environment 500 may include a processing resource 504 communicatively coupled to the non-transitory computer-readable medium 502 through a communication link 506.

In an example, the processing resource 504 may include a plurality of processors, each of which may be a processor of a computing device, such a computing device of the system 100. The non-transitory computer-readable medium 502 may be, for example, an internal memory device or an external memory device. In an implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to a cluster of computing nodes 510 over the network 508. The cluster of computing nodes 510 may be, for example, the first cluster.

In an example implementation, the non-transitory computer-readable medium 502 includes a set of computer-readable instructions assign IP addresses to services.

Referring to FIG. 5, in an example, the non-transitory computer-readable medium 502 includes instructions 512 that cause the processing resource 504 to receive a request for an Internet Protocol (IP) address for a first service. The first service includes a plurality of pods and is to operate on a first port. The first service may be a loadbalancer service and may be, for example, the first service 202. In an example, the first service is a Domain Name System (DNS) service for Transmission Control Protocol (TCP) and the first port is TCP port 53.

The non-transitory computer-readable medium 502 includes instructions 514 that cause assignment of a first IP address to the first service. For example, the instructions cause assignment of a combination of the first IP address and the first port to the first service.

The non-transitory computer-readable medium 502 includes instructions 516 that cause selection of a first node on which the first IP address is to be configured from among a plurality of nodes based on a number of IP addresses configured on each of the plurality of nodes.

In an example, to select the first node, the instructions are executable by the processing resource 504 to select a first Virtual Router Identifier (VRID) to which the first IP address is to be mapped from a plurality of VRIDs based on a number of IP addresses mapped to each of the plurality of VRIDs. The first VRID may include a first VRID instance running on the first node and a first VRID instance running on the second node. Further, the first VRID instance running on the first node may a master VRID instance of the first VRID and the first VRID instance running on the second node may be a backup VRID instance of the first VRID. The first VRID may be, for example, the first VRID 306. Accordingly, the first VRID instance running on the first node may be the first VRID instance 308 and the first VRID instance running on the second node may be the first VRID instance 310.

The non-transitory computer-readable medium 502 includes instructions 518 that cause configuration of the first IP address on the first node.

The non-transitory computer-readable medium 502 includes instructions 520 that cause receiving a request for an IP address for a second service and instructions 522 that cause assigning the first IP address to the second service. The second service includes a plurality of pods and is to operate on a second port. In an example, the second service is DNS for User Datagram Protocol (UDP), and the second port is UDP port 53. The second service may be a loadbalancer service.

The non-transitory computer-readable medium 502 further includes instructions 524-530. The instructions 524 cause receiving a first service request directed to the first IP address and the first port. The instructions 526 cause routing the first service request to a pod of the first service. To route the first service request, the instructions 526 may utilize a first set of routing rules that can be used to route service requests directed to the first IP address and the first port among pods of the first service. The first set of routing rules may be, for example, the first set of routing rules 226, and may be created in response to configuring the first IP address on the first node and assigning the first IP address to the first service.

The instructions 528 cause receiving a second service request directed to the first IP address and the second port and the instructions 530 cause routing the second service request to a pod of the second service. To route the second service request, the instructions 530 may utilize a second set of routing rules that can be used to route service requests directed to the first IP address and the second port among pods of the second service. The second set of routing rules may be, for example, the second set of routing rules 234, and may be created in response to assigning the first IP address to the second service.

In an example, in response to failure of the first node and in response to selection of the first VRID instance running on the second node as the master VRID instance of the first VRID, the non-transitory computer-readable medium 502 may include instructions to configure the first IP address on the second node.

The present subject matter enables creation of loadbalancer services without using load balancing plugins. For instance, by assigning an IP address to a service, by selecting a node among a plurality of nodes on which the IP address is to be configured, and accordingly configuring the IP address on that node, the service requests directed to the service are received on the node, which can then be routed to pods of the service. Therefore, the present subject matter can be utilized in bare metal clusters.

Further, by assigning the IP address to another service and creating routing rules to route service requests directed to the other service, the present subject matter ensures that the IP address can be shared among multiple services. Since bare metal clusters may have less number of IP addresses available, the present subject matter provides an optimal manner of managing the IP addresses available with the bare metal clusters.

The present subject matter also enables uniform distribution of IP addresses across several nodes of a cluster and also ensures that the routing of service requests continue even on failure of a node. Therefore, the present subject matter improves the reliability of a cluster of nodes that handle service requests.

Although implementations of assignment of internet protocol addresses to services have been described in language specific to structural features and/or methods, it is to be understood that the present subject matter is not necessarily limited to the specific features or methods described. Rather, the specific features and methods are disclosed and explained as example implementations.

We claim:

1. A system comprising:
a cluster manager to:
receive a first request for an Internet Protocol (IP) address for a first service, wherein the first service comprises a plurality of pods and is to operate on a first port;
assign a combination of a first IP address and the first port to the first service;
select a first node on which the first IP address is to be configured from among a plurality of nodes based on a number of IP addresses configured on each of the plurality of nodes;
receive a second request for an IP address for a second service, wherein the second service comprises a plurality of pods and is to operate on a second port; and
assign a combination of the first IP address and the second port to the second service; and
the plurality of nodes having the first node, the first node comprising a first configuration manager to:
configure the first IP address on the first node in response to selection of the first node for configuring the first IP address;
create a first set of routing rules usable by the first node to route a service request directed to the first IP address and the first port to a pod of the first service; and
create a second set of routing rules usable by the first node to route a service request directed to the first IP address and the second port to a pod of the second service.

2. The system of claim 1, wherein
the first request comprises a first sharing identifier,
the second request comprises a second sharing identifier, and
the cluster manager is to assign the combination of the first IP address and the second port to the second service in response to the first sharing identifier matching with the second sharing identifier.

3. The system of claim 1, wherein, to select the first node to configure the first IP address, the cluster manager is to select a first Virtual Router Identifier (VRID) to which the first IP address is to be mapped from a plurality of VRIDs based on a number of IP addresses mapped to each of the plurality of VRIDs, wherein
the plurality of nodes comprises a first node and a second node,
the first VRID comprises a first VRID instance running on the first node and a first VRID instance running on the second node,
the first VRID instance running on the first node is a master VRID instance of the first VRID, and
the first VRID instance running on the second node is a backup VRID instance of the first VRID.

4. The system of claim 3, wherein in response to failure of the first node and in response to the first VRID instance running on the second node becoming the master VRID instance of the first VRID, a second configuration manager of the second node is to configure the first IP address on the second node, and
the second node is to:
route service requests directed to the first IP address and the first port among pods of the first service based on the first set of routing rules; and
route service requests directed to the first IP address and the second port among pods of the second service based on the second set of routing rules.

5. The system of claim 4, wherein
the plurality of nodes further comprises a third node,
the first VRID comprises a first VRID instance running on the third node,
the first VRID instance running on the third node is a backup VRID instance of the first VRID, and
in response to failure of the first node, the first VRID instance running on the second node and the first VRID instance running on the third node are to:
elect the first VRID instance running on the second node as the master VRID instance of the first VRID.

6. The system of claim 1, wherein
the cluster manager is to:
receive a third request for an IP address from a third service, wherein the third service is to operate on the first port;
assign a combination of a second IP address and the first port to the third service; and
select a second node on which the second IP address is to be configured from among the plurality of nodes based on a number of IP addresses assigned to each of the plurality of nodes; and
the second node comprises a second configuration manager to:
configure the second IP address on the second node.

7. The system of claim 2, wherein
the cluster manager is to:
receive a third request for an IP address from a third service, wherein the third service is to operate on a third port and wherein the third request comprises a third sharing identifier different from the first sharing identifier;
assign a combination of a second IP address and the third port to the third service; and
select a second node on which the second IP address is to be configured among the plurality of nodes based on a number of IP addresses configured on each of the plurality of nodes; and
the second node comprises a second configuration manager to configure the second IP address on the second node.

8. The system of claim 1, wherein
the plurality of nodes comprises a second node;
the second node comprises a second configuration manager;
the first node comprises a first IP table;
the second node comprises a second IP table;
the first configuration manager is to add the first set of routing rules and the second set of rules to the first IP table; and
the second configuration manager is to add the first set of routing rules and the second set of routing rules in the second IP table.

9. The system of claim 1, wherein
the first service is a Domain Name System (DNS) for Transmission Control Protocol (TCP),
the second service is a DNS for User Datagram Protocol (UDP),
the first port is TCP port 53, and
the second port is UDP port 53.

10. A method comprising:
receiving a first request for an Internet Protocol (IP) address for a first service, wherein the first request comprises a first sharing identifier, the first service comprises a plurality of pods, and the first service is to operate on a first port;
assigning a combination of a first IP address and the first port to the first service;
selecting a first node on which the first IP address is to be configured from among a plurality of nodes based on a number of IP addresses configured on each of the plurality of nodes;
configuring the first IP address on the first node;
creating a first set of routing rules usable by the first node to route a service request directed to the first IP address and the first port to a pod of the first service;
receiving a second request for an IP address for a second service, wherein the second request comprises a second sharing identifier, the second service comprises a plurality of pods, and the second service is to operate on a second port;
assigning a combination of the first IP address and the second port to the second service in response to the first sharing identifier matching with the second sharing identifier; and
creating a second set of routing rules usable by the first node to route a service request directed to the first IP address and the second port to a pod of the second service.

11. The method of claim 10, comprising:
routing a first service request directed to the first IP address and the first port to the pod of the first service based on the first set of routing rules; and
routing a second service request directed to the first IP address and the second port to the pod of the second service based on the second set of routing rules.

12. The method of claim 10, wherein selecting the first node to configure the first IP address comprises selecting a first Virtual Router Identifier (VRID) to which the first IP address is to be mapped from a plurality of VRIDs based on a number of IP addresses mapped to each of the plurality of VRIDs, wherein
- the plurality of nodes comprises a first node and a second node,
- the first VRID comprises a first VRID instance running on the first node and a first VRID instance running on the second node,
- the first VRID instance running on the first node is a master VRID instance of the first VRID, and
- the first VRID instance running on the second node is a backup VRID instance of the first VRID.

13. The method of claim 12, comprising:
- selecting the first VRID instance running on the second node as the master VRID instance of the first VRID in response to failure of the first node; and
- configuring the first IP address on the second node.

14. The method of claim 10, wherein
- the first service is a Domain Name System (DNS) for Transmission Control Protocol (TCP),
- the second service is a DNS for User Datagram Protocol (UDP),
- the first port is TCP port 53, and
- the second port is UDP port 53.

15. A non-transitory computer-readable medium comprising instructions for assignment of internet protocol (IP) addresses to services, the instructions being executable by a processing resource to:
- receive a request for an Internet Protocol (IP) address for a first service, wherein the first service comprises a plurality of pods and is to operate on a first port;
- assign a first IP address to the first service;
- select a first node on which the first IP address is to be configured from among a plurality of nodes based on a number of IP addresses configured on each of the plurality of nodes;
- configure the first IP address on the first node;
- receive a request for an IP address for a second service, wherein the second service comprises a plurality of pods and is to operate on a second port;
- assign the first IP address to the second service;
- receive a first service request directed to the first IP address and the first port;
- route the first service request to a pod of the first service;
- receive a second service request directed to the first IP address and the second port; and
- route the second service request to a pod of the second service.

16. The non-transitory computer-readable medium of claim 15, wherein, the instructions are executable by the processing resource to:
- create, in response to configuring the first IP address on the first node and assigning the first IP address to the first service, a first set of routing rules to route service requests directed to the first IP address and the first port among pods of the first service;
- utilize the first set of routing rules to route the first service request to the pod of the first service;
- create, in response to assigning the first IP address to the second service, a second set of routing rules to route service requests directed to the first IP address and the second port among pods of the second service; and
- utilize the second set of routing rules to route the second service request to the pod of the second service.

17. The non-transitory computer-readable medium of claim 15, wherein, to select the first node to configure the first IP address, the instructions are executable by the processing resource to select a first Virtual Router Identifier (VRID) to which the first IP address is to be mapped from a plurality of VRIDs based on a number of IP addresses mapped to each of the plurality of VRIDs, wherein
- the plurality of nodes comprises a first node and a second node,
- the first VRID comprises a first VRID instance running on the first node and a first VRID instance running on the second node,
- the first VRID instance running on the first node is a master VRID instance of the first VRID, and
- the first VRID instance running on the second node is a backup VRID instance of the first VRID.

18. The non-transitory computer-readable medium of claim 17, wherein, in response to failure of the first node and in response to selection of the first VRID instance running on the second node as the master VRID instance of the first VRID, the instructions are executable by the processing resource to configure the first IP address on the second node.

19. The non-transitory computer-readable medium of claim 15, wherein
- the first service is a Domain Name System (DNS) for Transmission Control Protocol (TCP),
- the second service is a DNS for User Datagram Protocol (UDP),
- the first port is TCP port 53, and
- the second port is UDP port 53.

20. The non-transitory computer-readable medium of claim 15, wherein each of the first service and the second service is a loadbalancer service.

* * * * *